United States Patent [19]
Gudat

[11] Patent Number: 6,082,466
[45] Date of Patent: Jul. 4, 2000

[54] ROWCROP MACHINE GUIDANCE USING GROUND PENETRATING RADAR

[75] Inventor: Adam J. Gudat, Edelstein, Ill.

[73] Assignee: Caterpillar Inc., Peoria, Ill.

[21] Appl. No.: 09/181,483

[22] Filed: Oct. 28, 1998

[51] Int. Cl.⁷ ............................................. A01B 63/00
[52] U.S. Cl. ........................... 172/5; 172/6; 342/22; 180/168
[58] Field of Search ............... 172/4, 5, 6, 2, 172/4.5; 37/348, 382; 342/22, 129, 194; 701/50; 180/168

[56] References Cited

U.S. PATENT DOCUMENTS

| | | | |
|---|---|---|---|
| 4,518,044 | 5/1985 | Wiegardt et al. ........................ | 172/7 |
| 4,846,283 | 7/1989 | Batcheller ............................... | 172/10 |
| 5,031,705 | 7/1991 | Clemens ................................. | 172/6 |
| 5,181,572 | 1/1993 | Andersen et al. ..................... | 172/5 X |
| 5,438,817 | 8/1995 | Nakamura .............................. | 56/10.2 |
| 5,509,486 | 4/1996 | Anderson .............................. | 172/5 X |
| 5,607,205 | 3/1997 | Burdick .................................. | 299/1.5 |
| 5,647,439 | 7/1997 | Burdick et al. ........................ | 172/4.5 |
| 5,659,985 | 8/1997 | Stump .................................... | 172/3 X |
| 5,704,142 | 1/1998 | Stump .................................... | 172/5 X |
| 5,900,833 | 5/1999 | Sunlin et al. .......................... | 342/22 |
| 5,904,210 | 5/1999 | Stump et al. .......................... | 342/22 X |

OTHER PUBLICATIONS

"Owner's Report" On Automatic Guidance Systems, Farm Show vol. 13, No. 3, 1989, pp. 24–25.

*Primary Examiner*—Victor Batson
*Attorney, Agent, or Firm*—Steve D. Lundquist

[57] ABSTRACT

An apparatus and method is shown for determining the position of a rowcrop in a field being traversed by a mobile machine. The apparatus and method includes a ground penetrating radar (GPR) assembly located on the mobile machine, a processor for receiving a GPR receive signal from the GPR assembly and determining the position of the rowcrop, and a work implement attached to the mobile machine and adapted to move in a direction transverse the longitudinal direction of the mobile machine in response to the location of the rowcrop.

16 Claims, 4 Drawing Sheets

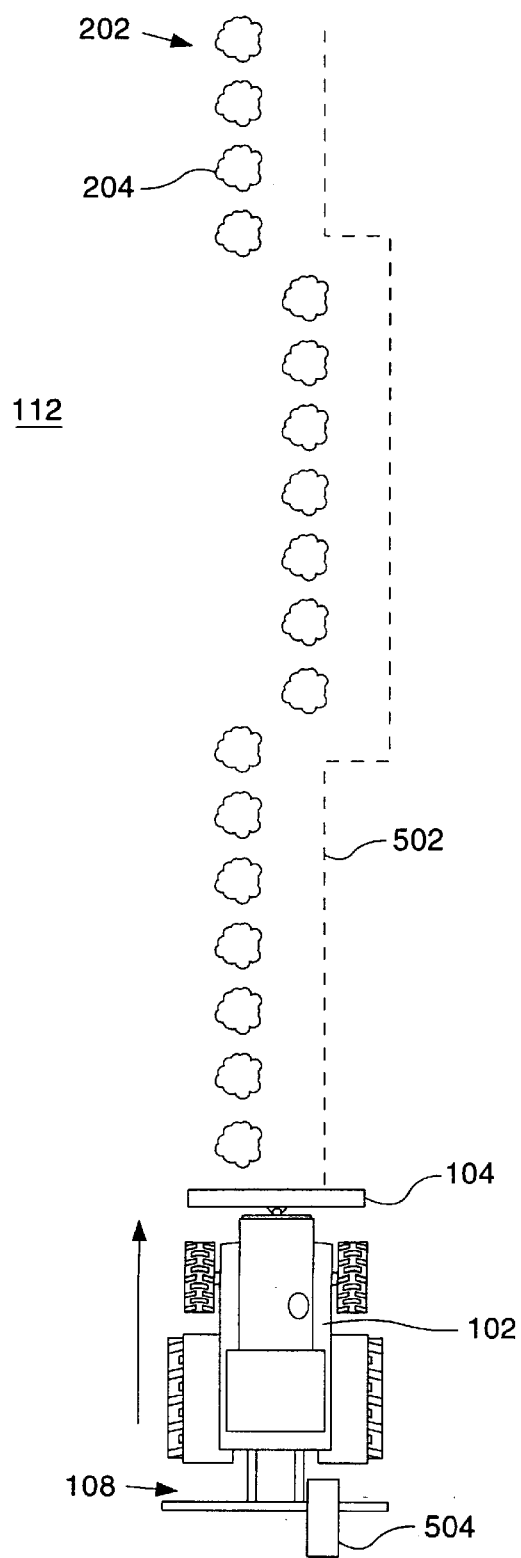

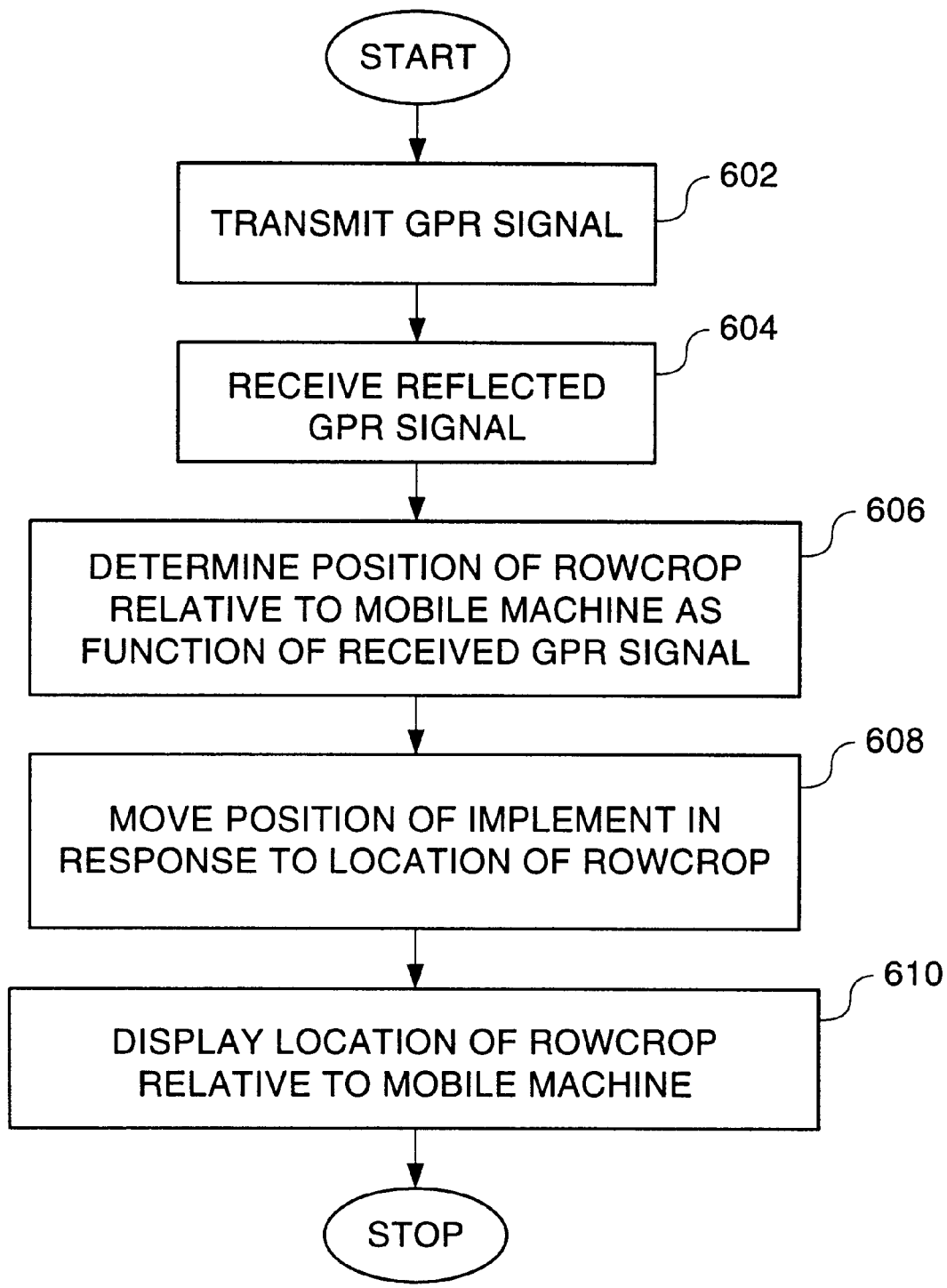

ROWCROP MACHINE GUIDANCE USING GROUND PENETRATING RADAR

TECHNICAL FIELD

This invention relates generally to a method and apparatus for determining the location of rowcrops in an agricultural field and, more particularly, to a method and apparatus for determining the locations of root balls of rowcrops using ground penetrating radar (GPR).

BACKGROUND ART

In agriculture, it is common to perform work operations in fields which contain crops by using tractors and other mobile machines. In these circumstances, care must be taken to avoid unwanted contact with the crops to prevent crop damage from occurring. For example, it is often required to loosen hardened soil between rows of crops to promote proper drainage of water in the fields by pulling a ripping apparatus through the soil adjacent the plants. However, care must be taken to avoid contact with the plants by the ripping apparatus.

Historically, farmers avoid inflicting damage to crops as much as possible by visually observing the locations of the rows of crops as the fields are traversed. However, over a period of time, it becomes more difficult to avoid contact with the crops as the farmers become fatigued. Additionally, it is sometimes difficult to maintain good visual contact with the rows.

The problem is much more difficult in certain situations where the crop may exist only under the surface of the earth as root balls. For example, sugar cane farming is based on leaving the root balls in the earth after harvest to grow into the next season's crop. During the time in which only root balls exist in the field, farmers may need to traverse the field to install irrigation drip lines, or to loosen hardpan, i.e., the hardened soil under the root balls. In these circumstances, the farmer has no view of the crop, and must rely on guessing the locations of the rows of root balls to avoid damaging the crop or wait until a new crop begins to grow.

Attempts have been made to determine the location of crops during initial passes over a field through the use of position determining methods such as global positioning satellite (GPS) systems, and storing this information in a database for subsequent use. For example, in U.S. Pat. No. 5,438,817, Nakamura discloses a system in which GPS stores in a database the location of rice plants growing in a rice field. The database is then used to determine the route to be traversed by a reaper.

However, in systems such as these, accuracy within several centimeters must often be maintained. Typical position determining systems cannot guarantee this type of accuracy throughout an entire field. In addition, if the initial database is not accurately created, the error will repeat every time machines enter the field.

Furthermore, maintaining and using a database of the locations of the crop adds cost and complexity to the overall system. It is often desired to detect the locations of the crop in real time using an accurate and economical detection means.

The present invention is directed to overcoming one or more of the problems as set forth above.

DISCLOSURE OF THE INVENTION

In one aspect of the present invention an apparatus for determining the position of a rowcrop in a field being traversed by a mobile machine is disclosed. The apparatus includes a ground penetrating radar (GPR) assembly located on the mobile machine, a processor for receiving a GPR receive signal from the GPR assembly and determining the position of the rowcrop, and a work implement attached to the mobile machine and adapted to move in a direction transverse the longitudinal direction of the mobile machine in response to the location of the rowcrop.

In another aspect of the present invention a method for determining the position of a rowcrop in a field being traversed by a mobile machine is disclosed. The method includes the steps of transmitting a ground penetrating radar (GPR) signal into the earth, receiving a reflected GPR signal from the earth, determining the position of the rowcrop as a function of the received GPR signal, and moving the position of a work implement in a direction transverse the longitudinal direction of the mobile machine in response to the location of the rowcrop.

BRIEF DESCRIPTION OF THE DRAWINGS

FIG. 5 is a diagrammatic illustration of a portion of the field as embodied with respect to another embodiment of the present invention; and FIG. 6 is a flowchart illustrating a method of the present invention.

BEST MODE FOR CARRYING OUT THE INVENTION

Figure 1:
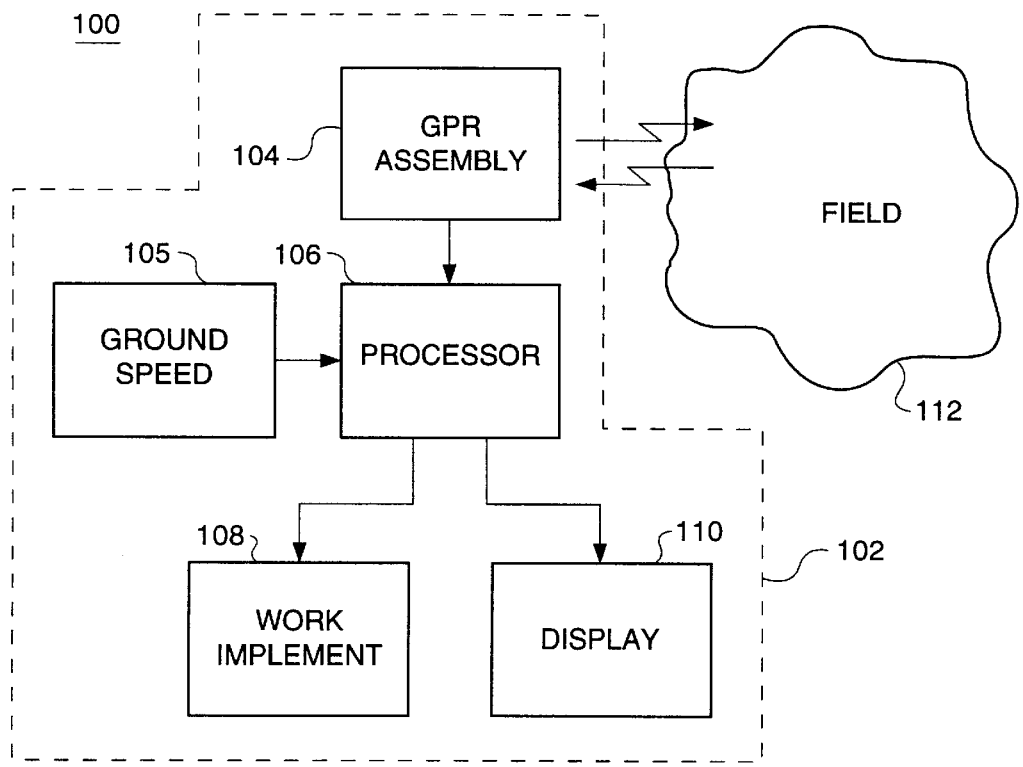
FIG. 1 is a block diagram illustrating an aspect of the present invention.

Referring to the drawings, and with particular reference to FIG. 1, an apparatus 100 for determining the position of a rowcrop in a field 112 being traversed by a mobile machine 102 is shown. For exemplary purposes, the present invention is discussed with respect to a field 112 having sugar cane as the rowcrop, and the mobile machine 102 is depicted as a tractor or dozer having a work implement 108, such as a ripper, attached. However, the present invention is adapted to work with other types of rowcrops, e.g., corn, potatoes, beets, and the like. The present invention may also be used with other types of mobile machines, e.g., harvesters, combines, trucks, etc.

Figure 2:
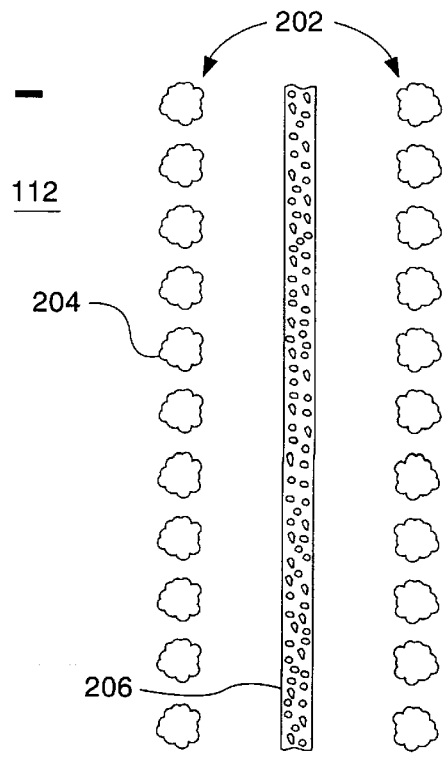
FIG. 2 is a diagrammatic illustration of a portion of a field as embodied with respect to an embodiment of the present invention.

Sugar cane farming typically involves regrowing root balls for approximately three to five growing seasons. As part of the harvest process, the sugar cane plants are cut off at the surface of the earth, and the root balls remain in the ground to grow as the next season's crop. During the period of time before the root balls sprout new sugar cane plants, about six weeks, it is often necessary to traverse the field 112 with the mobile machine 102, and work the earth with the work implement 108. For example, it is normally required to deploy a water drip line 206 between rows of root balls 204, as is shown in FIG. 2. It is also sometimes necessary to pull a ripper through the earth adjacent the root balls 204 to loosen the hardened soil, commonly known as hardpan. This procedure allows proper moisture drainage to allow water to reach the roots without collecting around the root balls 204 and causing them to rot.

During these traversals over the field 112, if an operator does not know the exact locations of the root balls 204, damage to the rowcrop 202 can occur by the work implement 108.

With continued reference to FIG. 1, a ground penetrating radar (GPR) assembly 104 is located on the mobile machine 102 at a position forward of the working direction of travel of the mobile machine 102. For example, if the mobile machine 102 is a tractor configured to pull a work implement 108, the GPR assembly 104 would be mounted at the front of the tractor.

Preferably, the GPR assembly 104 includes at least one GPR transmitter and receiver. The GPR transmitter is adapted to transmit a radar signal into the ground, and the GPR receiver is adapted to receive a reflected signal from the transmitted GPR signal.

In the preferred embodiment, the GPR assembly 104 is adapted to scan in a direction substantially transverse the longitudinal direction of the mobile machine 102, thus providing scanned coverage of a path in front of the mobile machine 102 which covers the width of the mobile machine 102 and the effective working width of the work implement 108.

In one embodiment, the GPR assembly 104 includes at least one GPR transmitter and receiver which is adapted to scan by the transmitter and receiver physically moving back and forth in front of the mobile machine 102.

In another embodiment, the GPR assembly 104 includes a linear array of GPR transmitters and receivers arranged substantially transverse the longitudinal direction of the mobile machine 102. The array of transmitters and receivers are configured to scan the path in front of the mobile machine 102 by sequencing back and forth in an electrical scanning pattern. This scanning array then generates a corresponding array of GPR receive signals.

A processor 106, located on the mobile machine 102, is adapted to receive the GPR receive signal from the GPR assembly 104 and responsively determine the position of the rowcrop 202 relative to the mobile machine 102. Preferably, the processor 106 also receives a ground speed signal from a ground speed detector 105 located on the mobile machine 102. By knowing the position and rate of scan of the GPR assembly 104, and the ground speed of the mobile machine 102, the processor 106 can determine and track the position of an object detected by the GPR assembly 104 relative to the mobile machine 102, as the mobile machine 102 moves.

The ground speed detector 105 may be any of a variety of possible detectors capable of determining ground speed including, for example, sensors for sensing rotation of the drive train, ultrasonic or radar ground speed sensors, and global positioning satellite systems.

A work implement 108 is controllably movably attached to the mobile machine 102 in a manner adapting the implement 108 to move in a direction transverse the longitudinal direction of the mobile machine 102. In the example described above, the work implement 108 is a ripper attached to the mobile machine 102 at a position rearward of the working direction of travel of the mobile machine 102. For example, the ripper is attached at the rear of a tractor. The ripper is adapted to rip through the earth as the mobile machine 102 traverses the field 112, the mobile machine 102 pulling the ripper behind it.

In a first embodiment, the processor 106 controllably moves the work implement 108 to avoid contact with the rowcrop 202, i.e., the root balls 204, detected by the GPR assembly 104.

In a second embodiment, a display 110 is located on the mobile machine 102, preferably in view by an operator. The display 110 indicates the location of the rowcrop 202 relative to the mobile machine 102, and allows the operator to control the position of the work implement 108 relative to the mobile machine 102 to avoid contact with the rowcrop 202. The display 110 may be graphical, showing the mobile machine 102 and the rowcrop 202 as icons, or the display may be an array of lights configured to indicate a direction to move the work implement 108, or to steer the mobile machine 102. Alternatively, the display may use a variety of visual methods, e.g., combinations of graphical icons and light arrays, to indicate the location of the rowcrop 202 relative to the mobile machine 102.

Figure 3:
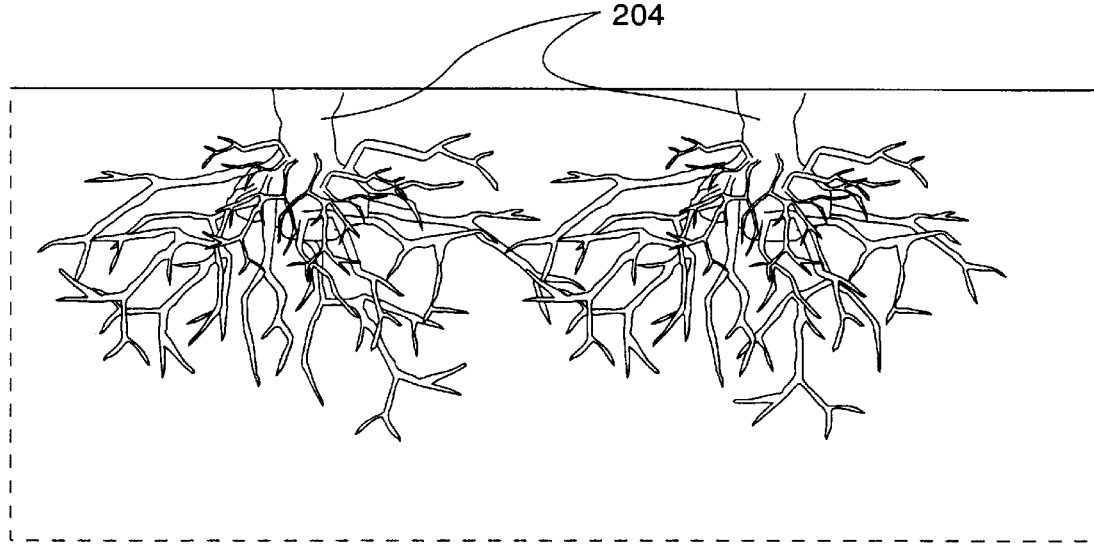
FIG. 3 is a diagrammatic illustration of a cross sectional view of a portion of earth in the field.
Figure 4:
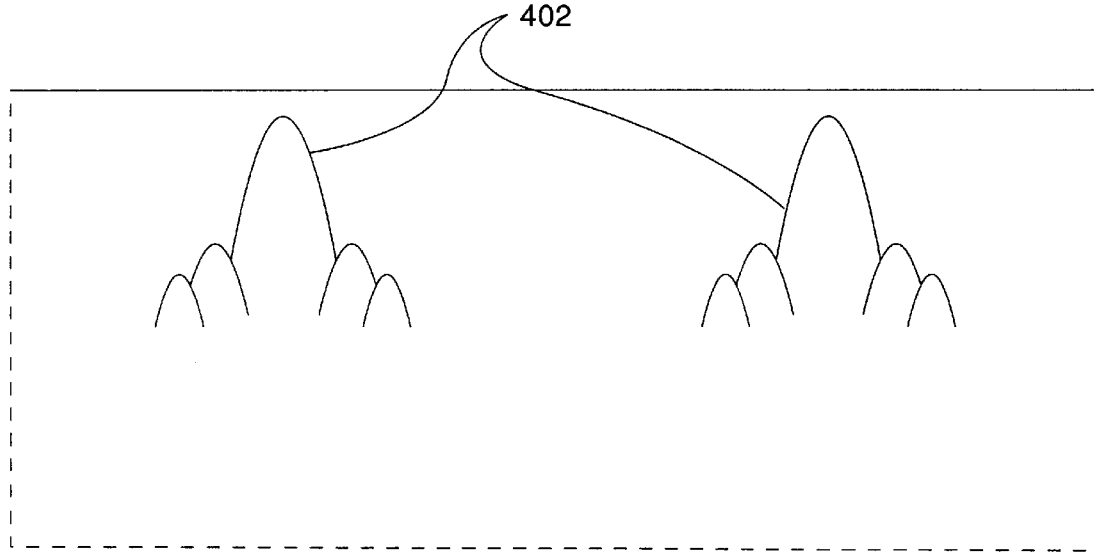
FIG. 4 is a graphical representation of a ground penetrating radar (GPR) display of the view of FIG. 3.

Referring to FIGS. 3 and 4, a cross sectional view of a portion of earth in the field, i.e., FIG. 3, and a graphical representation of a ground penetrating radar (GPR) display of the view of FIG. 3, i.e., FIG. 4, are shown. FIG. 3 shows diagrammatic illustrations of root balls 204 which lie just under the surface of the earth. FIG. 4 shows typical graphical representations of the root balls 204 of FIG. 3 as commonly produced by a GPR system.

Preferably, the GPR indications of root balls are produced when the transmitted GPR signal passes through the area of the root balls and the reflected GPR signal indicates the presence of the root balls based on a difference in moisture content of the roots as compared to the surrounding earth. Sugar cane root balls, for example, tend to absorb and hold moisture while the surrounding soil tends to drain moisture away.

As an alternative embodiment, however, the GPR assembly 104 could be configured to indicate the presence of root balls based on density differences between the roots and the surrounding soil.

Referring now to FIG. 5, a diagrammatic illustration of an embodiment of the present invention is shown. The mobile machine 102 traverses the field 112 along one or more rowcrops 202. The rowcrops 202 in the present example include rows of root balls 204, e.g., sugar cane root balls. The root balls 204 exist beneath the surface of the earth, and therefore are not visible to an operator of the mobile machine 102. The mobile machine 102 is pulling a work implement 108, e.g., a ripper 504, for the purpose of ripping and loosening hardpan in the present example. Hardpan is hardened and compacted soil that, if not loosened, causes water to collect around the roots of the sugar cane, which causes the roots to rot.

It is desired in the example of FIG. 5 to control the ripper 504 to follow a path 502 adjacent the root balls 204. The present invention is adapted to determine the locations of the root balls 204 relative to the mobile machine 102 using GPR technology. In addition, deviations of the rowcrop 202 from a straight line, as shown in FIG. 5, are detected by the GPR assembly 104 to allow the present invention to respond by controllably moving the ripper 504 to follow the desired path.

Referring to FIG. 6, a flowchart illustrating a method for determining the position of a rowcrop 202 in a field 112 being traversed by a mobile machine 102 is shown.

In a first control block 602, a GPR signal is transmitted into the earth, preferably in front of the working direction of travel of the mobile machine 102.

In a second control block 604, a reflected GPR signal is received by a GPR receiver on the GPR assembly 104. The GPR assembly 104 may have one or more than one GPR transmitter and receiver, and may be configured to operate in any one of the ways described above.

In a third control block 606, the position of a rowcrop 202 is determined relative to the mobile machine 102 as a function of the received GPR signal. Preferably, the position of the rowcrop 202 relative to the mobile machine 102 is tracked by determining the speed of the mobile machine 102 and the transverse position of the GPR transmitter and receiver when the rowcrop 202 is detected.

In a fourth control block 608, the position of a work implement 108 is controllably moved in a direction transverse the longitudinal direction of the mobile machine 102 in response to the location of the rowcrop.

In a fifth control block 610, the location of the rowcrop 202 relative to the mobile machine 102 is displayed to an operator of the mobile machine 102. Alternatively, a processor 106 controls the position of the work implement 108 directly.

INDUSTRIAL APPLICABILITY

As an example of an application of the present invention, sugar cane farming is normally performed by cutting off the sugar cane stalks at ground level and leaving the roots in the ground to grow into the next crop. During this period of time where only the roots exist, work must often be performed in the field. For example, irrigation drip lines may need to be laid in between rows of roots, and the soil adjacent the roots may need to be loosened by a work implement known as a ripper. It is important not to disturb the roots, which would damage the next crop of sugar cane. However, it is difficult, if not impossible to know exactly where the roots are, since they lie beneath the surface of the soil.

For this reason, the present invention, using ground penetrating radar technology, provides an apparatus and a method to determine the exact locations of the roots, which allows a farmer to work adjacent to the roots without damaging them.

Other aspects, objects, and features of the present invention can be obtained from a study of the drawings, the disclosure, and the appended claims.

What is claimed is:

1. An apparatus for determining a position of a rowcrop in a field being traversed by a mobile machine, comprising:

a ground penetrating radar (GPR) assembly located on the mobile machine at a position forward of a working direction of travel of the mobile machine;

a ground speed detector located on the mobile machine;

a processor, located on the mobile machine, for receiving a GPR receive signal from the GPR assembly, and a around speed signal from the around speed detector, and responsively determining the position of the rowcrop relative to the mobile machine as the mobile machine moves; and a work implement controllably movably attached to the mobile machine, wherein the work implement is adapted to move in a direction transverse a longitudinal direction of the mobile machine in response to the position of the rowcrop and the around speed of the mobile machine.

2. An apparatus, as set forth in claim 1, wherein the GPR assembly includes at least one GPR transmitter and receiver.

3. An apparatus, as set forth in claim 2, wherein the at least one GPR transmitter and receiver is adapted to scan in a direction substantially transverse the longitudinal direction of the machine.

4. An apparatus, as set forth in claim 3, wherein the at least one transmitter and receiver is adapted to scan by moving in a direction substantially transverse the longitudinal direction of the machine.

5. An apparatus, as set forth in claim 2, wherein the GPR assembly includes a linear array of GPR transmitters and receivers arranged substantially transverse the longitudinal direction of the machine.

6. An apparatus, as set forth in claim 5, wherein the linear array of GPR transmitters and receivers is adapted to generate a corresponding array of GPR receive signals.

7. An apparatus, as set forth in claim 5, wherein the linear array of GPR transmitters and receivers is adapted to sequentially scan in a direction substantially transverse the longitudinal direction of the mobile machine and responsively generate a sequential GPR receive signal.

8. An apparatus, as set forth in claim 1, further including a display located on the mobile machine and electrically connected to the processor, the display adapted to indicate the position of the rowcrop relative to the mobile machine.

9. An apparatus, as set forth in claim 1, wherein the rowcrop includes a plurality of root balls located in rows beneath the surface of the earth.

10. An apparatus, as set forth in claim 1, wherein the work implement is a ripper located at a position rearward of the working direction of travel of the mobile machine, and adapted to rip through the earth as the mobile machine traverses the field.

11. A method for determining a position of a rowcrop in a field being traversed by a mobile machine, including the steps of:

transmitting at least one ground penetrating radar (GPR) signal into the earth;

receiving at least one reflected GPR signal from the earth in response to a corresponding at least one transmitted signal;

receiving a ground steed signal indicative of a around speed of the mobile machine;

determining the position of the rowcrop relative to the mobile machine as the mobile machine moves, as a function of the at least one received GPR signal and the received ground speed signal; and controllably moving the position of a work implement in a direction transverse a longitudinal direction of the mobile machine in response to the position of the rowcrop and the around speed of the mobile machine, the work implement being attached to the mobile machine.

12. A method, as set forth in claim 11, further including the step of scanning the transmitted GPR signal in a direction substantially transverse the longitudinal direction of the mobile machine.

13. A method, as set forth in claim 12, wherein the step of scanning the transmitted GPR signal is performed by at least one GPR transmitter located on the mobile machine at a position forward of a working direction of travel of the mobile machine.

14. A method, as set forth in claim 11, further including the step of displaying the position of the rowcrop relative to the mobile machine.

15. A method, as set forth in claim 11, wherein the work implement is a ripper, and further including the step of ripping through the earth as the mobile machine traverses the field.

16. An apparatus for determining a position of a rowcrop in a field being traversed by a mobile machine, comprising:

a ground penetrating radar (GPR) assembly located on the mobile machine at a position forward of a working direction of travel of the mobile machine;

a ground speed detector located on the mobile machine;

a processor, located on the mobile machine, for receiving a GPR receive signal from the GPR assembly, and a ground speed signal from the around speed detector, and responsively determining the position of the rowcrop relative to the mobile machine as the mobile machine moves;

a work implement controllably movably attached to the mobile machine, wherein the work implement is adapted to move in a direction transverse a longitudinal direction of the mobile machine in response to the position of the rowcrop and the ground speed of the mobile machine; and a display located on the mobile machine and electrically connected to the processor, the display adapted to indicate the position of the rowcrop relative to the mobile machine.

* * * * *

UNITED STATES PATENT AND TRADEMARK OFFICE
CERTIFICATE OF CORRECTION

PATENT NO. : 6,082,466
DATED : July 4, 2000
INVENTOR(S) : Adam Gudat

It is certified that error appears in the above-identified patent and that said Letters Patent is hereby corrected as shown below:

Claim 1:
    Column 5, line 50, delete "around" add -- ground --
    Column 5, line 50, delete "around" add -- ground --
    Column 5, line 58, delete "around" add -- ground --

Claim 11:
    Column 6, line 35, delete "around" add -- ground --
    Column 6, line 44, delete "around" add -- ground --

Claim 16:
    Column 7, line 4, delete "around" add -- ground --

Signed and Sealed this

Twenty-second Day of May, 2001

Attest:

NICHOLAS P. GODICI

Attesting Officer     Acting Director of the United States Patent and Trademark Office